United States Patent [19]

Anthony

[11] Patent Number: 4,457,551

[45] Date of Patent: Jul. 3, 1984

[54] VEHICLE SPEED-LOCK WHEELCHAIR RESTRAINT SYSTEM

[75] Inventor: James W. Anthony, Somers, Conn.

[73] Assignee: Target Industries, Inc., Wharehouse Point, Conn.

[21] Appl. No.: 330,533

[22] Filed: Dec. 14, 1981

[51] Int. Cl.[3] .......................... B60N 1/02; B60P 3/06; B60P 7/08

[52] U.S. Cl. ...................................... 296/65 R; 410/4; 410/7; 410/51; 410/81

[58] Field of Search ............... 296/65 A, 65 R; 410/3, 410/51, 4, 7, 81

[56] References Cited

U.S. PATENT DOCUMENTS

| | | | |
|---|---|---|---|
| 1,644,528 | 10/1927 | Huff | 296/65 R |
| 2,427,161 | 9/1947 | Roe | 188/2 F X |
| 3,752,265 | 8/1973 | Lyder | 188/2 F |
| 4,027,747 | 6/1977 | Moorman, Jr. | 296/65 R |
| 4,204,588 | 5/1980 | Kawecki | 188/2 F |

FOREIGN PATENT DOCUMENTS

| | | | |
|---|---|---|---|
| 2452401 | 10/1980 | France | 410/51 |

*Primary Examiner*—Howard Beltran
*Attorney, Agent, or Firm*—Edwin E. Greigg

[57] ABSTRACT

A speed-lock restraint system for wheelchair systems having a frame assembly for a chair, arm rests and wheels, an inverted U-shaped main channel supported by said frame and extending between a front cross channel and a rear cross channel, an anchor supported from a floor plate having apertures therein, and a pivot arm with diametrically oppositely extending end projections, each of said projections capable of extending within said aperture in alignment and securably relating the wheelchair in speed-locking relation and restraint to a vehicle floor.

4 Claims, 3 Drawing Figures

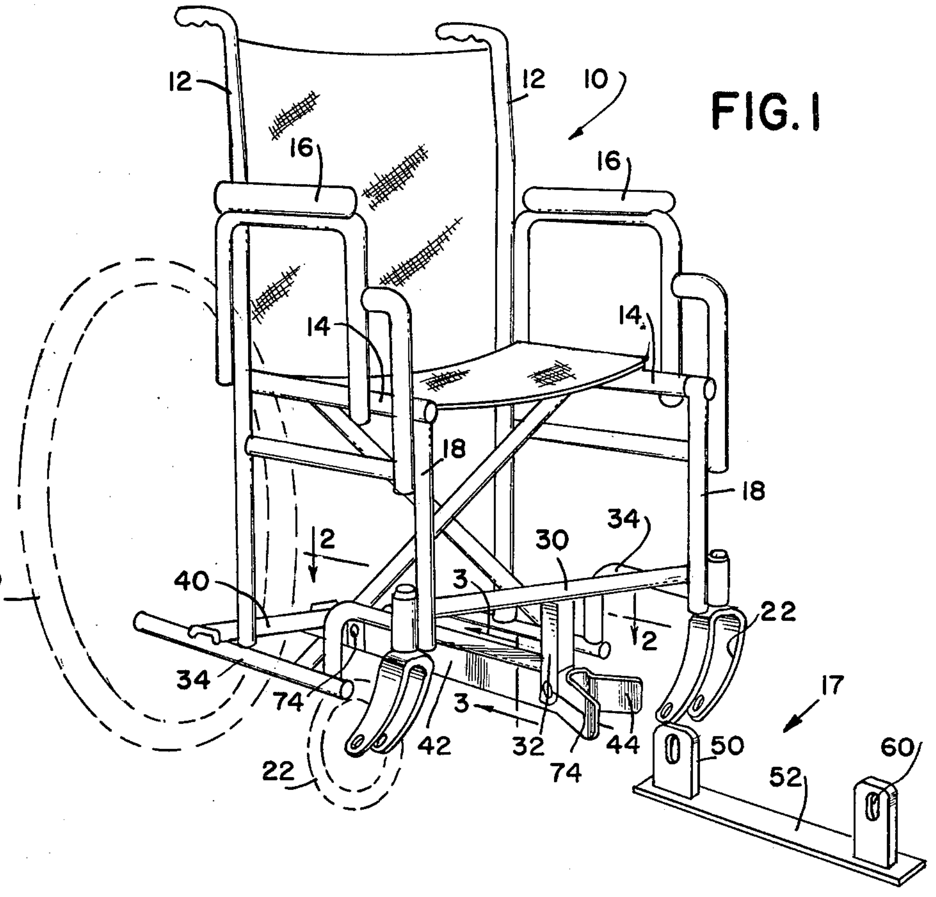
FIG. 1
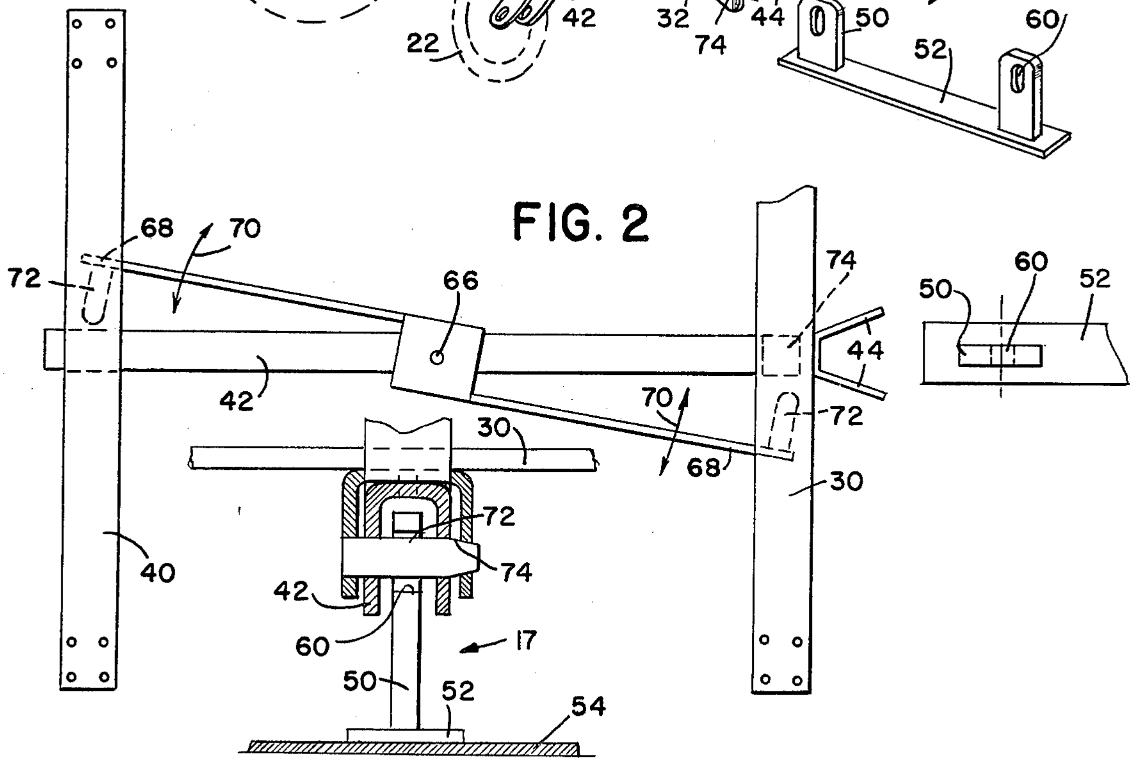
FIG. 2
FIG. 3

VEHICLE SPEED-LOCK WHEELCHAIR RESTRAINT SYSTEM

BRIEF SUMMARY OF THE INVENTION

The present invention relates to an improved structural arrangement comprising a speed lock wheelchair restraint system. More particularly the invention relates to a "speed lock" wheelchair tie-down arrangement having a channel assembly which may be affixed directly to either a manual or electric type wheelchair and having an anchor apparatus which is bolted or welded to the floor of a mobile vehicle as well as an aircraft.

It is within the purview of the concept of the invention to provide a safe wheelchair restraint for both normal driving loads, and low to moderate speed impact protection, by locking at least two components together. In this respect it is important to note the system is intended to restrain only the wheelchair and not a person disposed or seated on or in the wheelchair, since an independent restraint system is always generally utilized for the person separate and apart from the present type of invention. The system of the invention of course may be used by either a driver or passenger as is described in detail herein.

BACKGROUND OF THE INVENTION

U.S. Pats. Nos. 2,427,161; 3,752,265; 4,027,747; and 4,204,588 show brakes, braking mechanisms and the like associated with wheelchair systems as restraint type mechanisms or means. Such are associated with a primary or major set of wheels thereof and are found useful where there is no significant forces due to acceleration. However for persons having various characteristics, sizes, weights and strengths, it is found that a need exists within which to provide more secure and speedier reliable means by which a wheelchair may be secured and restrained while in a moving vehicle.

SUMMARY OBJECTS AND ADVANTAGES OF THE INVENTION

It is one of the objects of the present invention to provide a new structural arrangement for a speed lock wheelchair restraint system.

It is a further object and advantage of the present invention to provide a new wheelchair construction comprised of a new channel assembly which is bolted directly by manual or electrically operable means to a secure base such as a floor anchored mechanism. The floor anchor may be either bolted or welded to the vehicle floor and is arranged to engage securely into a new wheelchair mechanism to be described later herein.

The object and further advantage of the invention is to provide a safe wheelchair apparatus being resistant for both normal driving loads and as well to moderate speed impact situations, which according to the invention is accomplished by locking two components together. The system of the invention is intended to restrain only movements of the wheelchair itself, and not to restrain the wheelchair passenger or person therein. An independent restraint system accordingly is utilized for restraint of the person to the wheelchair and does not form a part of the present invention.

Another object and advantage of the invention is to provide a wheelchair system that may be used either by a driver or a passenger and to better withstand impacts and attenuated shocks that a vehicle may impose upon a wheelchair passenger.

BRIEF SUMMARY OF THE SEVERAL VIEWS OF THE DRAWING

The above and other objects and advantage of the invention will become apparent upon full consideration of the following detailed description and accompanying drawings in which:

FIG. 1 is a generally front perspective view of an improved speed lock restraint system and method for wheelchair apparatus;

FIG. 2 is an enlarged plan view taken along line 2—2 of FIG. 1 and showing a best mode and preferred embodiment of the invention; and FIG. 3 is a further enlarged elevation view of a feature thereof taken along line 3—3 of FIG. 1 thereof.

DETAILED DESCRIPTION OF THE PREFERRED EMBODIMENT OF THE INVENTION

Referring now to the drawings there is shown a form and structure of an improved wheelchair 10 having some conventional components and constructions including back frames 12, 12, chair frames 14, 14, armrests 16, 16, base frame mechanisms 18, 18 wheels 20 and balance or guide wheels 22.

A transverse cross member 30 is shown securely mounted on the base frames 18, 18 near the lower extremity thereof. Medially of this cross member 30 is secured a dependent projection 32 to one end of which is secured an inverted U-shaped channel member 42. The wheelchair is reinforced by a pair of horizontally disposed spaced frame members 34—34 (best seen in FIG. 1), these frame members being arranged to terminate forwardly of the downwardly extending vertical members 12 which support the rear edge of the chair seat. Another transversely extending member 40 which is spaced apart from the front cross member 30 is arranged to support the rear end of the inverted channel shaped member 42 to facilitate easy accomodation of the channel shaped member 42 with a floor fastened member 17 which will now be described. The front walls of the channel member are flared open to provide guide flanges for entrance of both of the upstanding anchor extensions 50—50 each of which are provided with apertures 60—60 for a purpose that will be understood as the description progresses.

The anchor extensions 50—50 are integral with a base plate 52 that may be suitably secured by bolting, welding or in any other manner to a surface on a conventional motor vehicle or a bus, train or airplane.

Referring at this time to FIGS. 2 and 3, it will be seen that the top surface of the channel shaped member 42 is provided with a pivot means 66, this pivot means being arranged to support oppositely extending arms 68—68 each of which arms are provided with flat surfaces. In close proximity to the ends of the oppositely extending arms 68—68 are provided offstanding projections 72—72 each of which extend in opposite directions.

Thus, it is believed to be apparent from this description that once the wheelchair carrying the channel shaped member 42 is brought into proper position with the upstanding apertured projections of the base member 52, the arms 68—68 are swung about the pivot means 66 so that the projections 72—72 are brought into coincidence with the apertures 74—74 on the base member. It is to be understood that the rear end of the channel member 42 is provided on its inner surface with a suitable blocking means which will engage the rearwardly positioned anchor extension 50 so that proper engagement of the aligned apertures in both the channel member and the anchor extension may be achieved without hunting.

The foregoing description has been based on a manual operation of the wheelchair and its cooperation with the floor or base locking means by nothing more than a push-pull cable system, however, it is to be understood that since many of the new wheelchairs are power operated it is conceivable that a "Delco" gearmotor may be mounted above the pivot means 66 and an operating switch means therefore may be mounted either on the left or right side of the wheelchair adjacent to the front thereof.

Accordingly, it is believed that persons skilled in the art will readily appreciate the significance and advantages of this improvement in a locking system for wheelchairs over those devices already known in the prior art.

The wheelchair apparatus is then seen as secured into place and regardless of the size and construction of the apparatus or the weight of the passenger or patient carried by the chair the wheelchair apparatus is capable of always being secure to the base or floor mechanism where it is carried with the attending restraint system. Of course from the above detailed description, it can be seen that the advantages of the system for 'speed-locking' a wheelchair in place on a vehicle and the like, is (1) ease of wheelchair registration with the locking means, (2) repeatability of wheelchair(s) location, such being critical for the quadriplegic user; (3) restraint of wheelchair against yaw, pitch, roll and shear forces with fore, aft and lateral force components; (4) ease in disengagement by hand in the event of power failure or life in threatening situations with either the manual or electric configuration operating the swing arms 68; and (5) the channel assembly reinforces the wheelchair frame to withstand impact better.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed and desired to be secured by Letters Patent are:

1. Improved speed lock restraint system for wheelchair systems comprising a wheelchair frame assembly supporting a seat and wheels and including at least four vertical bar members and having plural horizontal members defining said frame assembly, an inverted U-shaped main channel horizontally disposed and extending between a pair of said horizontal members of said wheelchair frame assembly, an anchor means secured to a floor plate having at least one upstanding extension with an aperture therein, and a pivot arm centrally pivotable from said U-shaped main channel having end projections for engaging an aperture of said U-shaped main channel and said aperture of said upstanding extension when aligned.

2. The invention as defined in claim 1, further wherein a flanged guide means is arranged to extend outwardly from said main channel to allow guidance of said anchor within said main channel.

3. The invention as defined in claim 1, further wherein at least two anchor means and corresponding apertures thereof provide a dual support arrangement to secure said main channel of the wheelchair apparatus to said floor plate.

4. The invention as defined in claim 3, wherein said projections are arranged to extend in diametrically opposite directions and adapted to be engaged substantially simultaneously into said apertures in said anchor plate.

* * * * *